Figure 1:
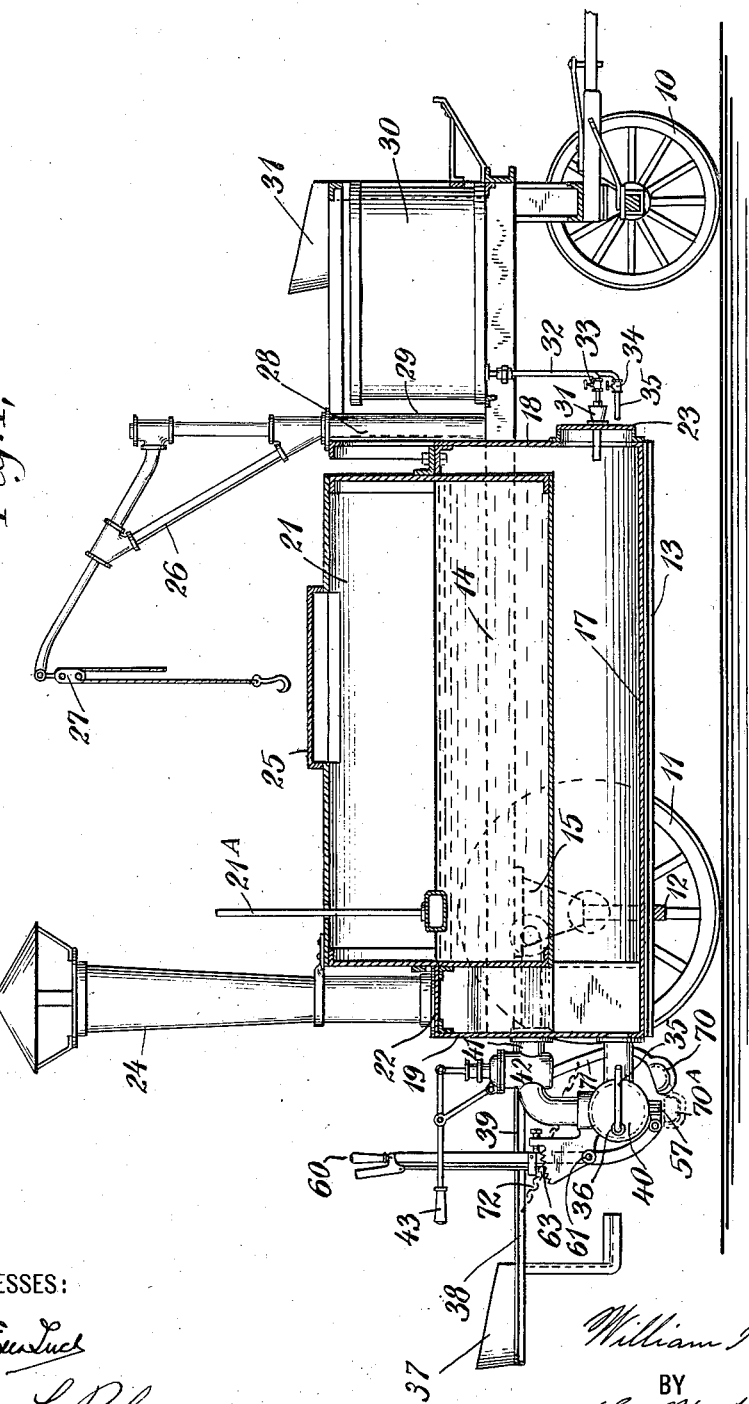

W. P. TARRANT.
ASPHALTING MACHINE.
APPLICATION FILED APR. 8, 1910.

1,059,647.

Patented Apr. 22, 1913.

4 SHEETS—SHEET 1.

WITNESSES:

INVENTOR
William P. Tarrant
BY
E. W. Marshall
ATTORNEY

W. P. TARRANT.
ASPHALTING MACHINE.
APPLICATION FILED APR. 8, 1910.
1,059,647.
Patented Apr. 22, 1913.
4 SHEETS—SHEET 2.
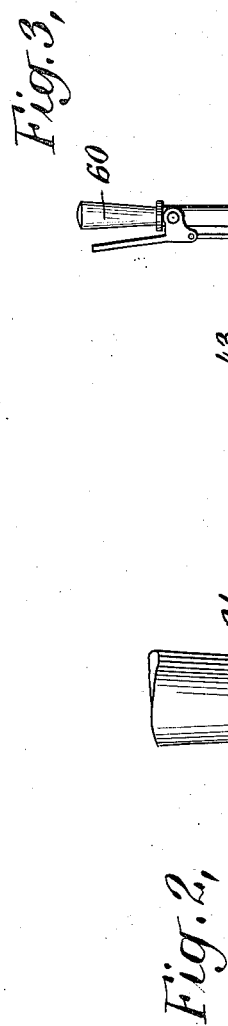
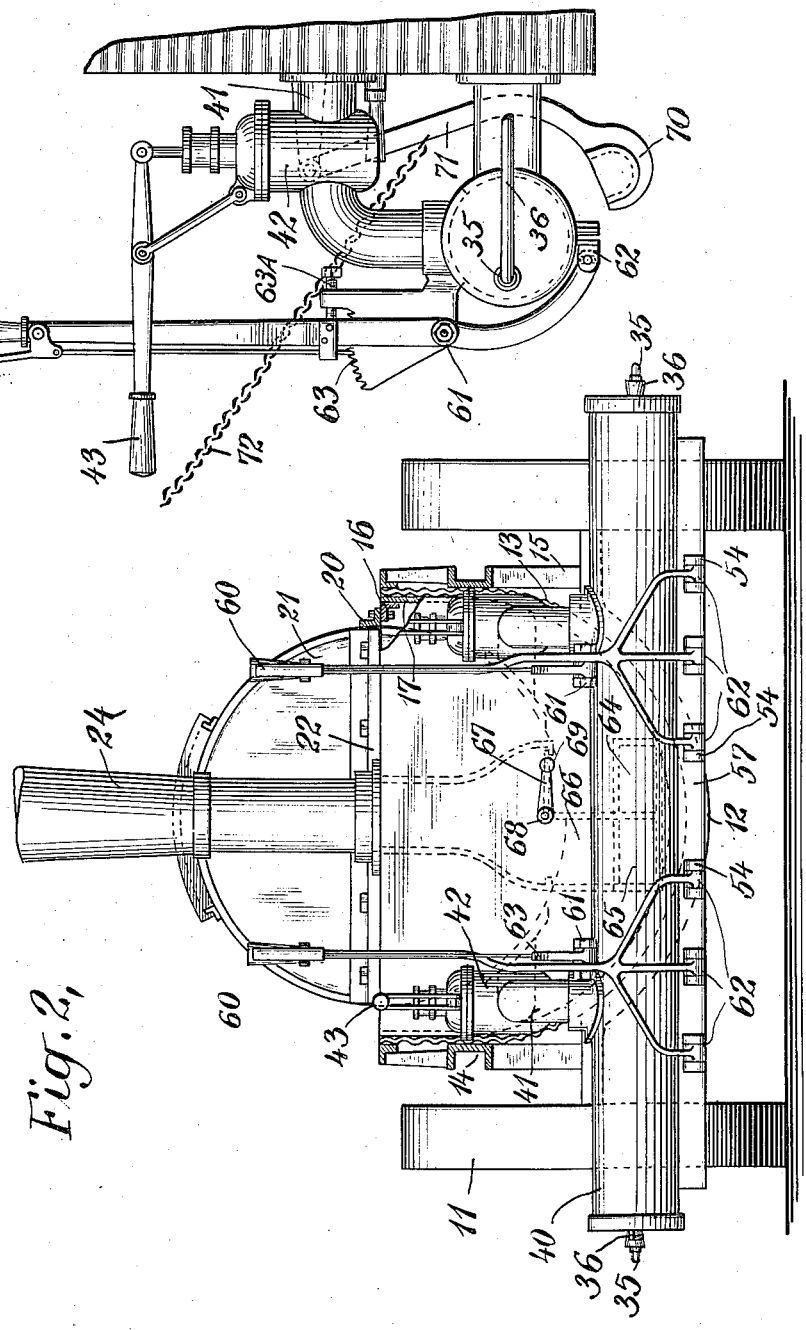
WITNESSES:
INVENTOR
William P. Tarrant
BY
E. W. Marshall
ATTORNEY

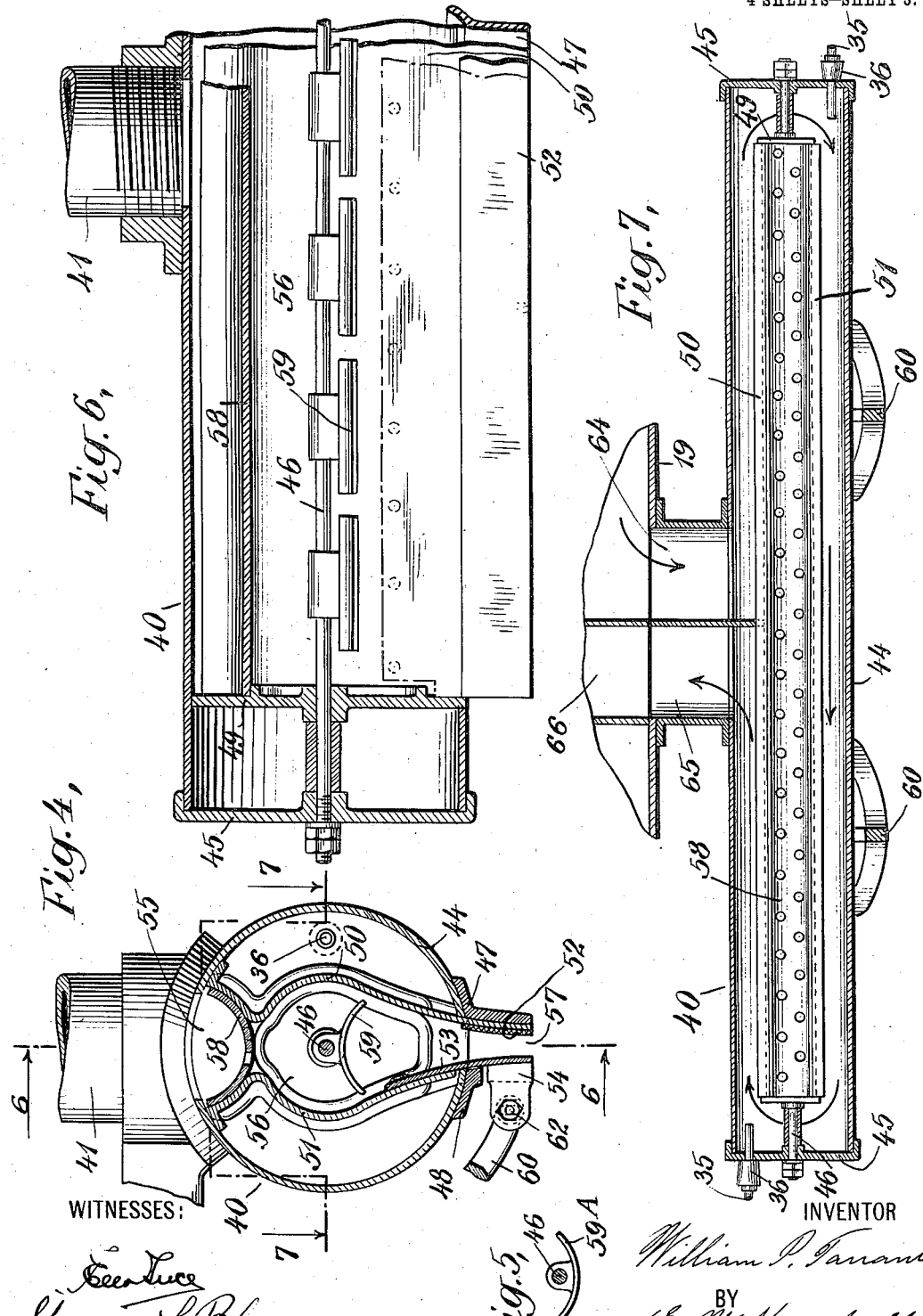

W. P. TARRANT.
ASPHALTING MACHINE.
APPLICATION FILED APR. 8, 1910.
1,059,647.
Patented Apr. 22, 1913.
4 SHEETS—SHEET 4.
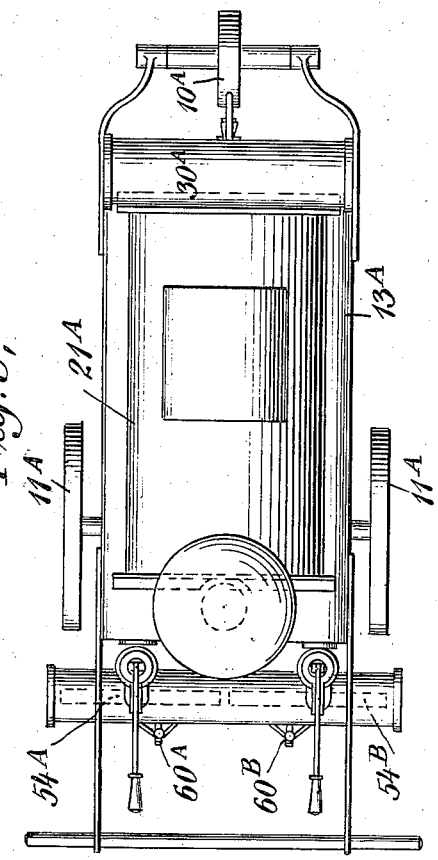
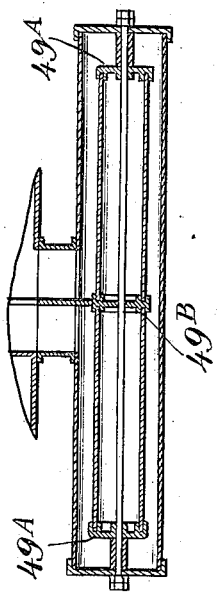
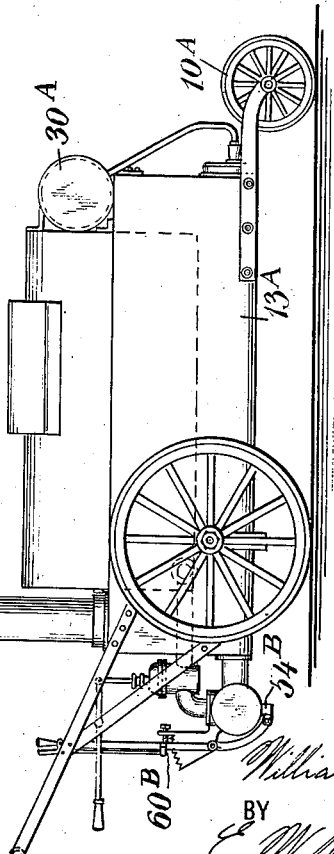
WITNESSES:
INVENTOR
William P. Tarrant
BY
E. W. Marshall
ATTORNEY

UNITED STATES PATENT OFFICE.

WILLIAM P. TARRANT, OF SARATOGA SPRINGS, NEW YORK.

ASPHALTING-MACHINE.

1,059,647.  Specification of Letters Patent.  Patented Apr. 22, 1913.

Application filed April 8, 1910. Serial No. 554,108.

*To all whom it may concern:*

Be it known that I, WILLIAM P. TARRANT, a citizen of the United States, and a resident of Saratoga Springs, in the county of Saratoga and State of New York, United States of America, have invented certain new and useful Improvements in Asphalting-Machines, of which the following is a specification.

My invention relates to apparatus designed more specifically for spraying or distributing a thin coating of hot asphalt over macadam or other roads, although it obviously may be used with other material and over other surfaces. Its object is to provide a portable and easily controlled machine for this purpose.

I will describe my invention in the following specification and point out the novel features thereof in the appended claims.

Referring to the drawings, Figure 1 is a side elevation, partly in section, of a machine made according to my invention. Fig. 2 is a rear elevation of this apparatus with the rear seat removed, and with a portion broken away to more clearly show the construction. In Fig. 3 certain details of the distributer and its control mechanism are shown in side elevation. An end view in cross section of the distributer is shown on an enlarged scale in Fig. 4. Fig. 5 is a detail showing a modified form of the deflectors which are shown in Fig. 4. Fig. 6 is a sectional end elevation of a portion of the distributer, the section being taken on the line 6—6 of Fig. 4. Fig. 7 is a sectional plan view of the distributer and a portion of the flues which are connected with it and with the firebox. This section is taken on the line 7—7 of Fig. 4. Fig. 8 is a side elevation of a modified form of my machine, showing one which is adapted to be propelled manually. Fig. 9 is a plan view of the apparatus shown in Fig. 8, and Fig. 10 is a sectional plan view showing, on a larger scale, a portion of the distributer used with this form of my apparatus.

Like characters of reference designate corresponding parts in all of the figures.

10 designates the front wheels of the machine or vehicle, and 11 its rear wheels. The latter are supported upon an axle 12 which is bent under and secured to the outer casing 13 of the apparatus. Channel-irons such as are shown at 14 may be secured to the sides of this casing, and, if desired, these channel-irons may be further connected with the axle 12 by means of brackets 15. This outer casing of the apparatus is preferably constructed in the form of a shell of corrugated steel with a semi-cylindrical bottom and with flat sides which are connected as shown by angle-irons 16, riveted to the upper edges thereof, with similar angle-irons 20 riveted to the sides of a cylindrical tank or receptacle 21. These angle-irons are preferably bolted together so that they may be separated when desired. The casing or shell 13 is preferably lined with a sheet of smooth steel 17 suitably affixed to the corrugated metal. The forward end of the casing is closed by a flat plate 18. 19 is the rear plate of the casing.

The front end plate is connected with the front of the cylindrical tank 21 by angle-irons, and the rear end plate is also connected with the tank by a plate 22. The outer casing thus forms an inclosed heating jacket or firebox about the lower portion of the tank.

A door 23 is provided in the front plate through which wood or other fuel may be placed in the firebox. A smoke-stack 24 through the plate 22 provides a vent for the hot gases in the chamber.

On the top of the tank or receptacle is an opening over which is fitted a sliding cover 25. This opening affords means of communication with the interior of the receptacle. The receptacle is adapted to hold a quantity of asphalt or other material which may be required to be heated to render it sufficiently fluid for the purposes of this apparatus. Such material in its heated condition may be run into the receptacle, or, if desired, it may be put in cold. A small derrick is provided to facilitate the handling of the material in its cold or solid form. This derrick comprises a frame 26 which may be made up of pipe and pipe fittings. On its outer and upper end a tackle 27 may be supported. This frame has a vertical pipe 28 screwed into an ordinary Y fitting to which the rest of the frame is connected. This pipe 28 is adapted to fit loosely within another pipe 29 which is permanently affixed to and is a part of the vehicle. The Y fitting limits the downward movement of the pipe 28 but allows it and the rest of the derrick frame to be rotated. By this simple arrangement asphalt barrels may be lifted into the receptacle, and when not in use the whole derrick may be removed and laid aside.

Resting on the channels 14 at the forward part of the vehicle are supports for an oil or fuel tank 30. Above this tank is the driver's seat 31. The fuel tank may be removed at will and a box for wood or coal substituted therefor when the conditions require.

As has been before stated, wood or other fuel may be used in the firebox, but I prefer to provide burners 31 for oil fuel, such as gasolene, kerosene or crude petroleum. As many of these as desired may be provided. They may be mounted directly upon the door 23. Pipes 32 leading from the tank to these burners are controlled by a valve or valves 33 and another valve 34 controls the pipe or pipes 35 which lead to burners 36 within the distributer which will be described hereinafter.

At the rear of the machine is an operator's seat 37 which is supported from the rest of the vehicle by means of a projecting frame 38.

40 is a distributer which I have invented. This runs transversely across the rear of the machine. Outlet pipes 41 lead from the lower portion of the receptacle 21 to the distributer through quick-acting valves 42. The controlling levers 43 for these valves are within easy reach from the operator's seat. It is desirable to provide screens over the ports where the pipes 41 are connected with the receptacle.

The distributer is best shown in Figs. 4, 6 and 7. It comprises an outer cylindrical drum or casing 44, the upper portion of which has flanged connections with the pipes 41. The ends of this drum are closed by caps 45 which are held on by means of nuts on the ends of a tie-rod 46 which runs centrally through the length of the distributer. The lower part of this cylindrical casing is split throughout the greater part of its length and its edges are fastened to angle-irons or stiffening bars 47 and 48.

An inner casing which may be constructed of two metallic sheets divides the outer cylindrical casing vertically into two compartments throughout that part of the casing which is split as above pointed out. One of these metallic sheets designated by 50 is riveted to the upper portion of the cylindrical casing 44. Its other end is carried down through the slot formed in the outer casing and is fastened to the angle-iron 47. 52 designates a packing of some such material as asbestos affixed along the lower side of this sheet opposite that part of it which is affixed to the angle-iron 47. The other sheet 51, which is somewhat similar in form, is fastened to the upper part of the cylindrical casing. Its lower end is cut off before it reaches the slot in the latter. 53 designates an apron, the upper edge of which is riveted to the sheet 51. This apron extends down through the slot in the outer casing and a bar 54 is fastened to it along its lower edge. The metallic sheets 50 and 51 may be bent into such shapes as to form an upper trough 55 into which the material from the receptacle 21 flows through pipes 41, a pear-shaped distributing chamber 56, and a nozzle 57 in the form of an elongated slot which, as I shall show, is of adjustable width. In the upper trough is a strainer plate 58 which arrests foreign matter which might clog up the nozzle. A series of swinging baffle plates 59 may be suspended from the rod 46 within the distributing chamber. In Fig. 5 a modified form of these baffle plates is shown and designated by 59. The end of this inner casing are closed by caps 49 which are held in place by bushings about the rod 46 between these caps and the outer caps 45.

60, 60 designate adjusting levers which are pivoted at stationary points 61 and are each connected below their pivots with the bar 54 at a plurality of points as shown at 62.

63 is a rack and pawl mechanism by means of which the adjusting levers may be held in place.

One side of the outer cylindrical casing is connected with the main chamber formed between the casing 13 and the receptacle 21 or the firebox by a passage 64. The inner wall of this passage divides the forward side of the chamber between the drum or cylindrical casing 44 and the distributing chamber in two. Any hot gases which come into the drum through the passage 64 must pass around the two ends of the inner casing in the direction indicated by the arrows, out through a passage 65 and flue 66 before they can reach the stack 24. A damper 67 is fastened to a shaft 68 on which is a heavy or weighted handle 69 by means of which the damper may be manipulated. When the damper is in the position in which it is shown in Fig. 2 the hot gases from the firebox to the flue must take the course above pointed out. Two burners 36 are shown supported by the caps 45 at opposite ends and upon opposite sides of the outer cylindrical casing. These are so placed that their flames will take the same course as that of the hot gases from the firebox. But when the damper is thrown over to the left the interior of the firebox is in direct communication with the stack. The handle 69 is within easy reach from the operator's seat and its weight will cause the damper to remain in whichever of its operative positions it has been placed.

70 designates a trough which is supported upon swinging arms 71.

72 is a chain, one end of which is connected with one of the arms 71 and its other end is placed within the reach of the operator.

Before more fully describing the other figures of the drawings I will point out the operation of this apparatus. The receptacle is filled with the desired material which, when hot, will be in a fluid condition. It is well to provide a float gage 21^A so that the quantity of the material in the receptacle may be ascertained at a glance. A fire is built in the firebox, or the burners are lighted. When the damper is turned over to the right the hot gases will circulate not only about the exterior of the receptacle but also through the distributer so that its parts will be heated to liquefy any material which may have congealed therein, and also to heat its parts so that the material will pass through them readily without sticking. The oil burners 36 within the distributer casing may also be used if more heat is required. These burners may be used in conjunction with the oil burners in the firebox, or they may be used when a wood or coal fire is used within the casing 13. When less heat is required in the distributer, the damper is thrown over to the left when the hot gases from the firebox will pass directly to the stack, and their path through the distributer drum will be shut off. While the apparatus is in constant use the various parts will become indirectly heated sufficiently for them to perform their functions.

The vehicle may be drawn over the surface which is to be covered. Now the valves 42 may be opened so that the material may flow through the slot-like distributer nozzle in a thin sheet which may be controlled by means of the levers 60 and their connections with the bar 54. The width of this slot and consequently the thickness of this flowing sheet of hot asphalt or other material may be varied at will by means of the levers 60 and their connections with the bar 54. It is to be understood that the apron 53 has considerable flexibility in order to facilitate this part of the operation. It is also possible in this arrangement to lay a thicker coating of the material on one side of the apparatus than on the other. The operator may even close the slot entirely to cut off the flow by pressing the apron 53 against the packing 52, or the valves 42 may be closed whenever desired. Set-screws 63^A may be provided to limit the maximum opening of the slot. It is sometimes desirable to cut off the flow of the liquid abruptly and to facilitate such an operation the trough 70 is provided. The shape of its supporting arms is such that the trough will hang to one side of the nozzle, but by pulling the chain 72 the operator may swing the trough into the position 70^A in which it is shown in dotted lines in Fig. 1, when it will catch the drippings or any of the material which may flow out through the nozzle.

In Figs. 8, 9 and 10 of the drawings a small machine is shown which may be propelled and controlled by one man. In this form of my apparatus the same principles are used. The vehicle is constructed, as before, with an outer casing 13^A which forms a firebox surrounding a cylindrical tank or receptacle 21^A for the material. A pair of wheels 11^A are provided on the sides of this casing and a single front wheel 10^A is connected with the rest of the vehicle by a rigid frame. This construction is preferred in the hand propelled machine as they may be more accurately guided when all of the wheels are mounted upon the rigid frame. 30^A is a fuel tank and 24^A the stack. The construction and arrangement of the other parts of this apparatus are much like those which have already been pointed out. But in this case it is desirable to divide the interior of the distributing chamber by a head 49^B intermediate its end heads 49^A, and to provide two adjusting levers 60^A and 60^B connected with the stiffening bar which is also cut in two. In the drawings its parts are designated by 54^A and 54^B. This arrangement is made so as to provide for the use of either side of the distributer independently so that the operator may walk on one side of the apparatus and lay the coating of material on the other side. Obviously both sides of the distributer may be used at once when desired.

While this apparatus is designed primarily for the purpose of distributing materials which require to be heated to liquefy them, it is evident that some of its novel features may be used to advantage with oil or even with water, and consequently my invention is not limited to the use of heated asphalt or similar materials, or even to its specific use as a road machine.

What I claim is.—

1. A distributer comprising a horizontally disposed cylindrical casing closed at its ends and provided with an opening in its lower portion, walls within said casing connected with the upper portion of the casing and projecting through said opening, thereby dividing the interior of the casing longitudinally, said walls being constructed to form a chamber and a nozzle shorter than the cylindrical casing, a transverse division plate between the cylindrical casing and one of said walls, an intake flue connected with the casing at one side of said division plate, and an outlet flue at the other side of said plate.

2. A distributer comprising a horizontally disposed casing provided with an opening in the lower portion thereof, outer caps arranged to close the ends of said casing, walls within said casing connected with the upper portion of the casing and projecting through said opening, thereby dividing the interior of said casing longitudinally, said walls being constructed to form a chamber and a nozzle shorter than the cylindrical casing, inner caps fitted over said walls to close the ends of said chamber, a transverse division plate between the cylindrical casing and one of said walls, an intake flue connected with the casing at one side of said division plate, and an outlet flue on the other side of the plate.

3. A distributer comprising a horizontally disposed cylindrical casing closed at its ends and provided with an opening in its lower portion, walls within said casing connected with the upper portion of the casing and projecting through said opening, thereby dividing the interior of said casing longitudinally, said walls being constructed to form a chamber and a nozzle shorter than the cylindrical casing, a transverse division plate between the cylindrical casing and one of said walls, an intake flue connected with the casing at one side of said division plate, an outlet flue at the other side of said plate, and a damper above said division plate arranged to control the flow of hot gases through said flue and through the spaces between the casing and said walls.

4. A distributer comprising a horizontally disposed casing provided with an opening in the lower portion thereof, outer caps arranged to close the ends of the casing, metallic walls within said casing connected with the upper portion of the casing and projecting through said opening thereby dividing the interior of said casing longitudinally, said walls being constructed to form a chamber and a nozzle shorter than the cylindrical casing, inner caps fitted over said metallic walls to close the ends of said chamber, a transverse division plate between the cylindrical casing and one of said metallic walls, an intake flue connected with the casing at one side of said division plate, an outlet flue on the other side of the plate, a burner on one side of one of the outer end plates, and a burner on the opposite side of the other outer plate, said burners being within the casing and outside of said chamber.

5. A distributer comprising a horizontally disposed casing provided with an opening in the lower portion thereof, outer caps arranged to close the ends of said casing, walls within said casing connected with the upper portion of the casing and projecting through said opening thereby dividing the interior of said casing longitudinally, said walls being constructed to form a chamber and a nozzle shorter than the cylindrical casing, inner caps fitted over said walls to close the ends of said chamber, a tie-rod through all of said caps arranged to hold them together, and a plurality of baffle-plates on said rod within the chamber.

6. A distributer comprising an outer inclosing casing provided with an opening in the lower portion thereof, walls within said casing connected with the upper portion of the casing and projecting through said opening, said walls being constructed to form a chamber and a nozzle, heating means between the casing and said walls, and a lever arranged to adjust the opening in said nozzle.

7. A distributer comprising an outer inclosing casing provided with an opening in the lower portion thereof, a pair of sheet metal walls connected with the upper portion of the casing and projecting through said opening, said walls being constructed to form a chamber and a nozzle, heating means between the casing and said walls, a rigid connection between one of said walls and the lower part of the casing at one side of the opening, the lower portion of the other wall being laterally movable, and a lever connected with said movable portion whereby said portion may be moved in relation to the other wall.

8. A distributer comprising an outer horizontal inclosing casing provided with an opening in the lower portion thereof, a pair of walls within said casing connected with the upper portion of the casing, the lower end of one of said walls projecting through and connected with the casing at one side of said opening, the other of said walls comprising as a portion thereof a flexible apron projecting through the opening, and a lever connected with and arranged to adjust the position of said apron.

9. A distributer comprising an outer horizontal inclosing casing provided with an opening in the lower portion thereof, a pair of walls within said casing connected with the upper portion of the casing, the lower end of one of said walls projecting through and connected with the casing at one side of said opening, the other of said walls comprising as a lower portion thereof a flexible apron projecting through the opening, a lever connected with and arranged to adjust the position of the connecting portion of the apron in relation to the projecting portion of the other wall, and means for holding the lever in desired positions.

10. A receptacle, a distributer comprising an outer inclosing casing provided with an opening in the lower portion thereof, walls of sheet metal within said casing connected with the upper portion of the casing and projecting through said opening, said walls being constructed to form a chamber and a nozzle, a pipe connecting the receptacle with the upper portion of said chamber, a manually operated valve in said pipe, a lever arranged to adjust the opening of said nozzle, and heating means between the casing and said walls.

11. In an asphalting machine, a vehicle, a receptacle supported thereon, a distributer connected with the receptacle, a heating jacket about the receptacle, a stack, means for passing hot gases from said jacket around the distributer to the stack and a plurality of fluid burners within the distributer arranged to assist the aforesaid circulation of hot gases from the jacket around the distributer.

12. In an asphalting machine, a vehicle, a receptacle supported thereon, a heating jacket about the receptacle, a fire-box within said jacket, a distributer connected with the receptacle, a stack, means for passing hot gases of combustion from said fire-box through the jacket and around the distributer, and means in the distributer for assisting the heating thereof and the circulation of hot gases therethrough.

13. In an asphalting machine, a vehicle, a receptacle supported thereon, a casing about the receptacle forming a heating jacket therefor, a stack, a distributer connected with the receptacle, said distributer comprising an outer casing provided with an opening in the lower portion thereof, walls within said casing connected with the upper portion of the casing and projecting through said opening, said walls being constructed to form a chamber and a nozzle, and means connecting the space within the heating jacket directly with the stack or through the space between the distributer casing and the walls therein.

In testimony whereof I have signed my name to this specification in the presence of two subscribing witnesses.

WILLIAM P. TARRANT.

Witnesses:
ELLA LUCK,
ERNEST W. MARSHALL.